United States Patent
Lee et al.

(10) Patent No.: US 8,675,732 B2
(45) Date of Patent: Mar. 18, 2014

(54) METHOD AND APPARATUS OF COMPRESSING IMAGE DATA

(75) Inventors: Si-hwa Lee, Seoul (KR); Sang-jo Lee, Suwon-si (KR)

(73) Assignee: Samsung Electronics Co., Ltd., Suwon-Si (KR)

(*) Notice: Subject to any disclaimer, the term of this patent is extended or adjusted under 35 U.S.C. 154(b) by 1179 days.

(21) Appl. No.: 12/007,794

(22) Filed: Jan. 15, 2008

(65) Prior Publication Data

US 2009/0041112 A1 Feb. 12, 2009

(30) Foreign Application Priority Data

Aug. 6, 2007 (KR) ........................ 10-2007-0078669

(51) Int. Cl.
- *H04N 7/12* (2006.01)
- *H04N 11/02* (2006.01)
- *G06K 9/36* (2006.01)

(52) U.S. Cl.
USPC .............. 375/240.1; 375/240.25; 375/240.18; 382/232; 382/246

(58) Field of Classification Search
USPC ............ 375/240.1–240.26, 240.29, 245–253; 382/166–251, 254–274; 370/230–232
See application file for complete search history.

(56) References Cited

U.S. PATENT DOCUMENTS

| | | | |
|---|---|---|---|
| 5,557,271 A * | 9/1996 | Rim et al. | 341/67 |
| 6,272,180 B1 * | 8/2001 | Lei | 375/240.16 |
| 6,445,826 B1 * | 9/2002 | Kadono | 382/243 |
| 6,865,299 B1 * | 3/2005 | Nakayama | 382/246 |
| 6,973,216 B2 * | 12/2005 | Sekino | 382/236 |
| 6,980,597 B1 * | 12/2005 | Ling | 375/240.19 |
| 7,003,034 B2 * | 2/2006 | Roh | 375/240.11 |
| 7,013,050 B2 * | 3/2006 | Kajiwara | 382/240 |
| 7,167,988 B2 * | 1/2007 | Hayashi | 713/187 |
| 7,221,804 B2 * | 5/2007 | Atsumi et al. | 382/239 |
| 7,317,407 B2 * | 1/2008 | Moriya et al. | 341/51 |
| 7,330,598 B2 * | 2/2008 | Fukuhara et al. | 382/240 |
| 7,454,070 B2 * | 11/2008 | Ito et al. | 382/232 |
| 7,565,018 B2 * | 7/2009 | Srinivasan | 382/232 |
| 7,626,733 B2 * | 12/2009 | Kodama et al. | 358/426.07 |
| 7,627,181 B2 * | 12/2009 | Tamura et al. | 382/232 |
| 7,714,873 B2 * | 5/2010 | Flavell et al. | 345/582 |
| 2006/0056714 A1 * | 3/2006 | Nomizu | 382/232 |
| 2007/0036223 A1 * | 2/2007 | Srinivasan | 375/240.18 |
| 2008/0043846 A1 * | 2/2008 | Yokoyama | 375/240.16 |
| 2008/0198933 A1 * | 8/2008 | Srinivasan et al. | 375/240.18 |
| 2009/0225871 A1 * | 9/2009 | Omori | 375/240.27 |
| 2009/0310677 A1 * | 12/2009 | Shiodera et al. | 375/240.15 |
| 2010/0114581 A1 * | 5/2010 | Li et al. | 704/500 |

FOREIGN PATENT DOCUMENTS

| | | |
|---|---|---|
| JP | 5-37914 | 2/1993 |
| JP | 2002-118861 | 4/2002 |
| JP | 2004-288198 | 10/2004 |
| KR | 10-2006-0077776 | 7/2006 |
| KR | 10-2006-0120191 | 11/2006 |
| KR | 10-2006-0129744 | 12/2006 |

* cited by examiner

*Primary Examiner* — M. Phan
(74) *Attorney, Agent, or Firm* — Staas & Halsey LLP

(57) ABSTRACT

A method and an apparatus of compressing image data are provided. The method of compressing data comprises calculating differences between values of predetermined pixels from among pixels constructing an image and values of reference pixels respectively corresponding to the predetermined pixels; ordering bits, which correspond to bit strings of the differences, into bit planes; and coding the bit planes according to priority of the bit planes.

18 Claims, 9 Drawing Sheets

FIG. 5
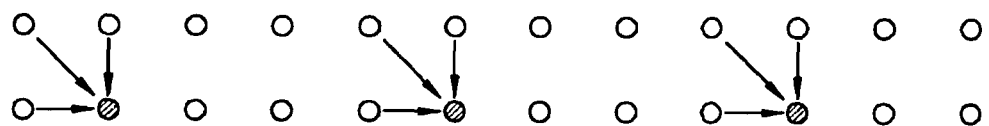
FIG. 6
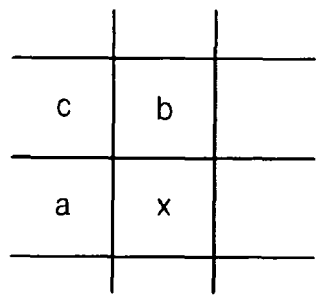
FIG. 7
| PREDICTION ERROR | 8 | 18 | 7 | 2 | 4 | 7 | 14 | 5 | |
|---|---|---|---|---|---|---|---|---|---|
| MSB | 0 | 0 | 0 | 0 | 0 | 0 | 0 | 0 | 0 – PLANE |
| | 0 | 0 | 0 | 0 | 0 | 0 | 0 | 0 | 1 – PLANE |
| | 0 | 0 | 0 | 0 | 0 | 0 | 0 | 0 | 2 – PLANE |
| | 0 | 1 | 0 | 0 | 0 | 0 | 0 | 0 | 3 – PLANE |
| | 1 | 0 | 0 | 0 | 0 | 0 | 1 | 0 | 4 – PLANE |
| | 0 | 0 | 1 | 0 | 1 | 1 | 1 | 1 | 5 – PLANE |
| | 0 | 1 | 1 | 1 | 0 | 1 | 1 | 0 | 6 – PLANE |
| LSB | 0 | 0 | 1 | 0 | 0 | 1 | 0 | 1 | 7 – PLANE |

FIG. 9

| | m=2 | m=4 | m=8 | m=16 |
|---|---|---|---|---|
| 0 | 00 | 000 | 0000 | 00000 |
| 1 | 01 | 001 | 0001 | 00001 |
| 2 | 100 | 010 | 0010 | 00010 |
| 3 | 101 | 011 | 0011 | 00011 |
| 4 | 1100 | 1000 | 0100 | 00100 |
| 5 | 1101 | 1001 | 0101 | 00101 |
| 6 | 11100 | 1010 | 0110 | 00110 |
| 7 | 11101 | 1011 | 0111 | 00111 |
| 8 | 111100 | 11000 | 10000 | 01000 |
| 9 | 111101 | 11001 | 10001 | 01001 |
| 10 | 1111100 | 11010 | 10010 | 01010 |
| 11 | 1111101 | 11011 | 10011 | 01011 |
| 12 | 11111100 | 111000 | 10100 | 01100 |
| 13 | 11111101 | 111001 | 10101 | 01101 |
| 14 | 111111100 | 111010 | 10110 | 01110 |
| 15 | 111111101 | 111011 | 10111 | 01111 |
| 16 | 1111111100 | 1111000 | 110000 | 100000 |
| 17 | 1111111101 | 1111001 | 110001 | 100001 |
| 18 | 11111111100 | 1111010 | 110010 | 100010 |
| 19 | 11111111101 | 1111011 | 110011 | 100011 |
| 20 | 111111111100 | 11111000 | 110100 | 100100 |
| 21 | 111111111101 | 11111001 | 110101 | 100101 |
| 22 | 1111111111100 | 11111010 | 110110 | 100110 |
| 23 | 1111111111101 | 11111011 | 110111 | 100111 |
| 24 | 11111111111100 | 111111000 | 1110000 | 101000 |
| 25 | 11111111111101 | 111111001 | 1110001 | 101001 |
| 26 | 111111111111100 | 111111010 | 1110010 | 101010 |
| 27 | 111111111111101 | 111111011 | 1110011 | 101011 |
| 28 | 1111111111111100 | 1111111000 | 1110100 | 101100 |
| 29 | 1111111111111101 | 1111111001 | 1110101 | 101101 |
| 30 | 11111111111111100 | 1111111010 | 1110110 | 101110 |
| 31 | 11111111111111101 | 1111111011 | 1110111 | 101111 |

FIG. 10

| PLANE IDENTIFIER | | 6:1 | 5:1 | 4:1 | 3:1 |
|---|---|---|---|---|---|
| 3 | 37 | | 8 | 12 | 20 |

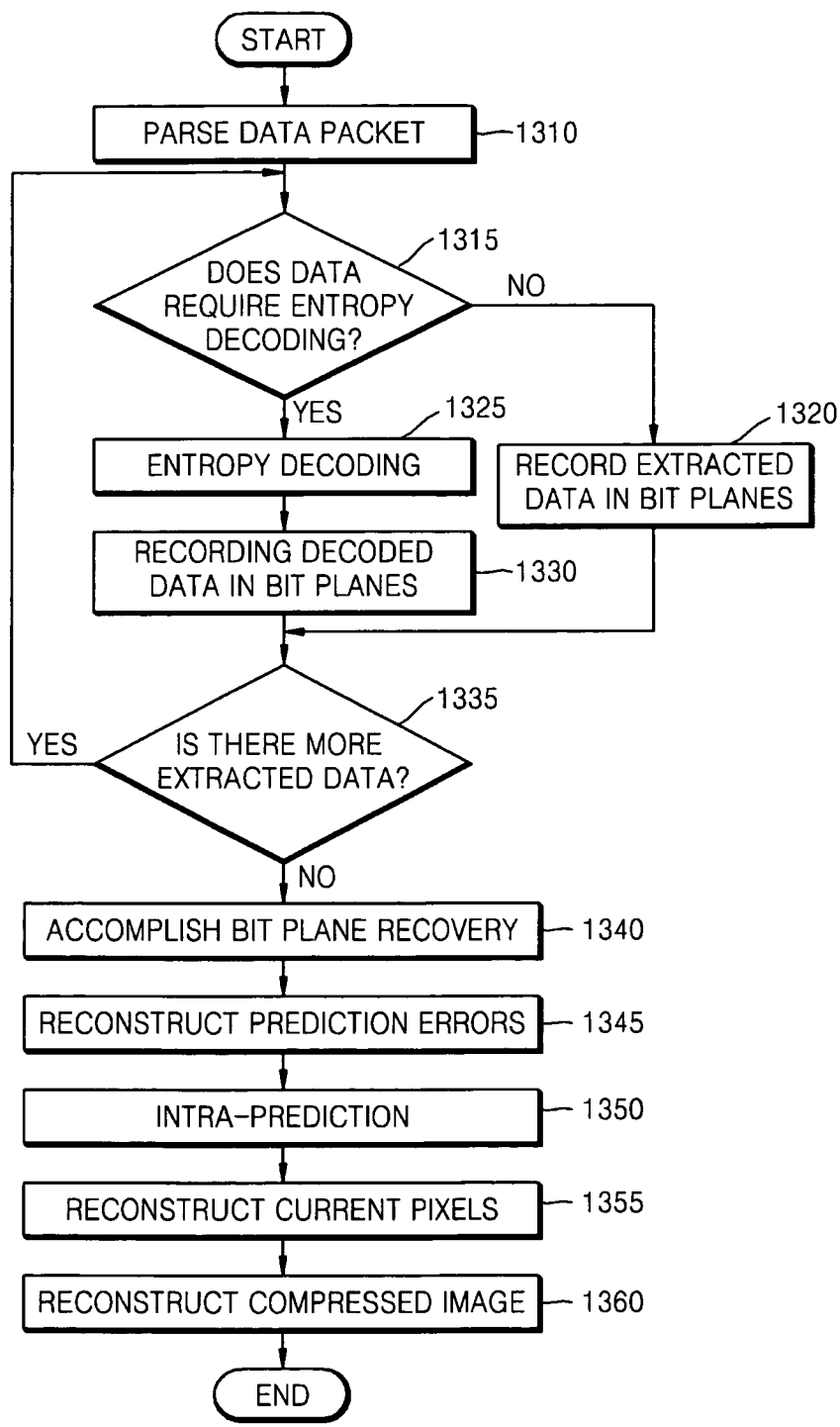

METHOD AND APPARATUS OF COMPRESSING IMAGE DATA

CROSS-REFERENCE TO RELATED PATENT APPLICATION

This application claims the benefit of Korean Patent Application No. 10-2007-0078669, filed on Aug. 6, 2007, in the Korean Intellectual Property Office, the disclosure of which is incorporated herein in its entirety by reference.

BACKGROUND OF THE INVENTION

1. Field of the Invention

The present invention relates to a system of compressing and decompressing image data and, more particularly, to an image encoding/decoding system suitable for a liquid crystal display dynamic capacitance compensation (LCD DDC) apparatus.

2. Description of the Related Art

FIG. 1 is a block diagram of a conventional LCD DCC apparatus. Referring to FIG. 1, the conventional LCD DCC apparatus includes a memory 110 and a lookup table (LUT) module 120. The LCD DCC apparatus applies a voltage higher than a required pixel voltage to a thin film transistor-liquid crystal display (TFT-LCD) panel in order to improve a response time of the TFT-LCD panel. For example, when a current pixel voltage of an LCD panel is A and the next pixel voltage is B, the LCD DCC apparatus does not applies voltages A and B and sequentially supplies voltages A, C and B to the LCD panel. An operation of calculating a voltage for improving a response time of a TFT-LCD panel in the conventional LCD DCC apparatus illustrated in FIG. 1 will now be explained.

The memory 110 receives a current picture and stores the received current picture. When the memory 110 receives the current picture, a previous picture has been stored in the memory 110. The LUT module 120 calculates a voltage required for a target response time of the TFT-LCD panel with reference to a lookup table. Specifically, the LUT module 120 finds out information on a voltage corresponding to a difference between the luminance of a pixel of a currently input picture and the luminance of a corresponding pixel of a previous picture stored in the memory 110 from the lookup table and calculates the voltage required for the target response time of the TFT-LCD panel using the information and the target response time of the TFT-LCD panel.

As described above, the previous picture must be stored in the memory 110 of the LCD DCC apparatus in order to calculate the voltage required for the target response time of the TFT-LCD panel. However, the quantity of data corresponding to a single picture increases as picture quality increases. Accordingly, attempts to compress pictures input to the LCD DCC apparatus and store the compressed pictures in the memory instead of directly storing the pictures in the memory are being made.

Conventional techniques of compressing images include JPEG (Joint Photographic Expert Group), H.264 (intra coding), JPEG-LS and so on. However, these techniques have following programs when applied to LCD DCC.

Firstly, when image data is compressed with compression ratios 1/2 through 1/3 using the above-described techniques, objective picture quality measured using a peak signal-to-noise ratio is not decreased. However, in the case of JPEG or H.264 based on transform coding, subjective picture quality is deteriorated. In particular, an edge of an image becomes indistinct and picture quality at the edge is decreased. Though JPEG can obtain high compression efficiency, picture quality deterioration can be easily confirmed when the picture quality is compared to the picture quality of an original image. Since the LCD DCC apparatus is a circuit for driving a TFT-LCD channel directly shown to people, subjective picture quality is very important in a compression codec for the LCD DCC.

Secondly, the conventional image compression techniques cannot obtain an accurate compression ratio. The conventional image compression techniques can control a compression ratio to a certain extent. However, an accurate compression ratio is required in order to store data in a memory with a limited capacity such as the memory of the LCD DCC apparatus. Particularly, JPEG-LS requires a number of bits greater than the number of bits of an original image because JPEG-LS uses a variable length code.

SUMMARY OF THE INVENTION

The present invention provides a method and an apparatus for obtaining an accurate compression ratio required for LCD DCC while improving subjective picture quality in an image reconstruction process such that the subjective picture quality is suitable for image compression for LCD DCC.

The present invention also provides a computer readable recording medium storing a program for executing the method on a computer.

According to an aspect of the present invention, there is provided A method of compressing data, comprising: calculating differences between values of predetermined pixels from among pixels constructing an image and values of reference pixels respectively corresponding to the predetermined pixels; ordering bits, which correspond to bit strings of the differences, into bit planes; and coding the bit planes according to priority of the bit planes.

According to another aspect of the present invention, there is provided a computer readable recording medium storing a program for executing the method of compressing data.

According to another aspect of the present invention, there is provided an apparatus of compressing data, comprising: a subtractor calculating differences between values of predetermined pixels from among pixels constructing an image and values of reference pixels respectively corresponding to the predetermined pixels; a bit order unit ordering bits, which correspond to bit strings of the differences, into bit planes; and a coding unit coding the bit planes according to priority of the bit planes.

According to another aspect of the present invention, there is provided a method of decompressing data, comprising: decoding coded data; ordering the decoded data into bit planes; reading the ordered bit planes in a vertical direction to reconstruct prediction errors; and adding the reconstructed prediction errors and reference pixel values respectively corresponding to the prediction errors to reconstruct current pixels.

According to another aspect of the present invention, there is provided a computer readable recording medium storing a program for executing the method of decompressing data.

According to another aspect of the present invention, there is provided an apparatus of decompressing data, comprising: a decoder decoding coded data; a bit plane recovery unit ordering the decoded data into bit planes; an error reconstruction unit reading the ordered bit planes in a vertical direction to reconstruct prediction errors; and a adder adding the reconstructed prediction errors and reference pixel values respectively corresponding to the prediction errors to reconstruct current pixels.

As described above, the data compression method according to the present invention calculates differences between values of predetermined pixels from among pixels constructing an image and values of reference pixels respectively corresponding to the predetermined pixels; orders bits corresponding to bit strings of the calculated differences into bit planes, and encodes the bit planes according to priority of the ordered bit planes to obtain an accurate compression ratio required for LCD DCC while improving subjective picture quality in an image reconstruction process such that the subjective picture quality is suitable for image compression for LCD DCC.

BRIEF DESCRIPTION OF THE DRAWINGS

The above and other features and advantages of the present invention will become more apparent by describing in detail exemplary embodiments thereof with reference to the attached drawings in which:

FIG. 5 illustrates prediction directions used in an intra-prediction unit illustrated in FIG. 3 according to an embodiment of the present invention;

FIG. 6 illustrates pixels used for the intra-prediction unit illustrated in FIG. 3 to perform intra-prediction using an edge detection method according to an embodiment of the present invention;

FIG. 7 illustrates prediction errors ordered as bit planes by a bit order unit illustrated in FIG. 3 according to an embodiment of the present invention;

FIG. 9 illustrates a Golomb code table according to a parameter m used in an entropy coding unit illustrated in FIG. 3 according to an embodiment of the present invention;

FIG. 10 illustrates a data packet generated by a bit packing unit illustrated in FIG. 3 according to an embodiment of the present invention;

FIG. 13 is a flow chart illustrating a data reconstruction method according to an embodiment of the present invention.

DETAILED DESCRIPTION OF THE INVENTION

Figure 1:
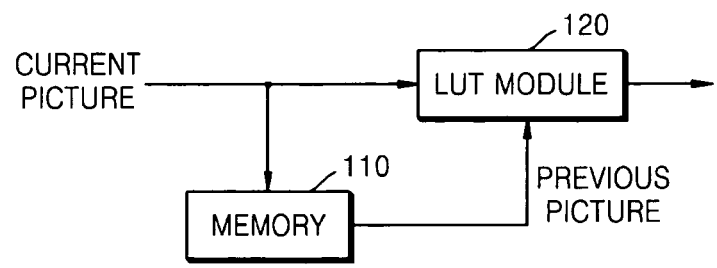
FIG. 1 is a block diagram of a conventional liquid crystal display dynamic capacitance compensation (LCD DCC) apparatus.

The present invention will now be described more fully with reference to the accompanying drawings, in which exemplary embodiments of the invention are shown. The invention may, however, be embodied in many different forms and should not be construed as being limited to the embodiments set forth herein; rather, these embodiments are provided so that this disclosure will be thorough and complete, and will fully convey the concept of the invention to those skilled in the art. Throughout the drawings, like reference numerals refer to like elements.

Figure 2:
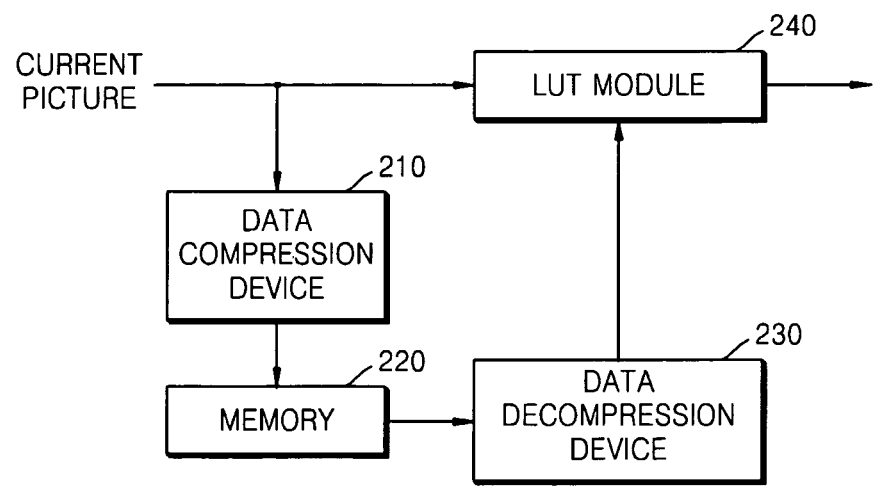
FIG. 2 is a block diagram of an LCD DCC apparatus according to an embodiment of the present invention.

FIG. 2 is a block diagram of an LCD DCC apparatus according to an embodiment of the present invention. Referring to FIG. 2, the LCD DCC apparatus according to an embodiment of the present invention includes a data compression device 210, a memory 220, a data decompression device 230, and a LUT module 240.

The data compression device 210 compresses data using intra-prediction, entropy coding and so on. The memory 220 receives the compressed data from the data compression device 210 and stores the compressed data. When the memory 220 receives a current picture, compressed data corresponding to a previous picture has been stored in the memory 220.

The data decompression device 230 decompresses data using entropy decoding. The LUT module 240 calculates a voltage required for a target response time of a TFT-LCD panel with reference to a lookup table. Specifically, the LUT module 240 finds out information on a voltage corresponding to a difference between the luminance of a pixel of a currently input picture and the luminance of a corresponding pixel of a previous picture decompressed by the data decompression device 230 and calculates the voltage required for the target response time of the TFT-LCD using the information and the target response time of the TFT-LCD panel.

Figure 3:
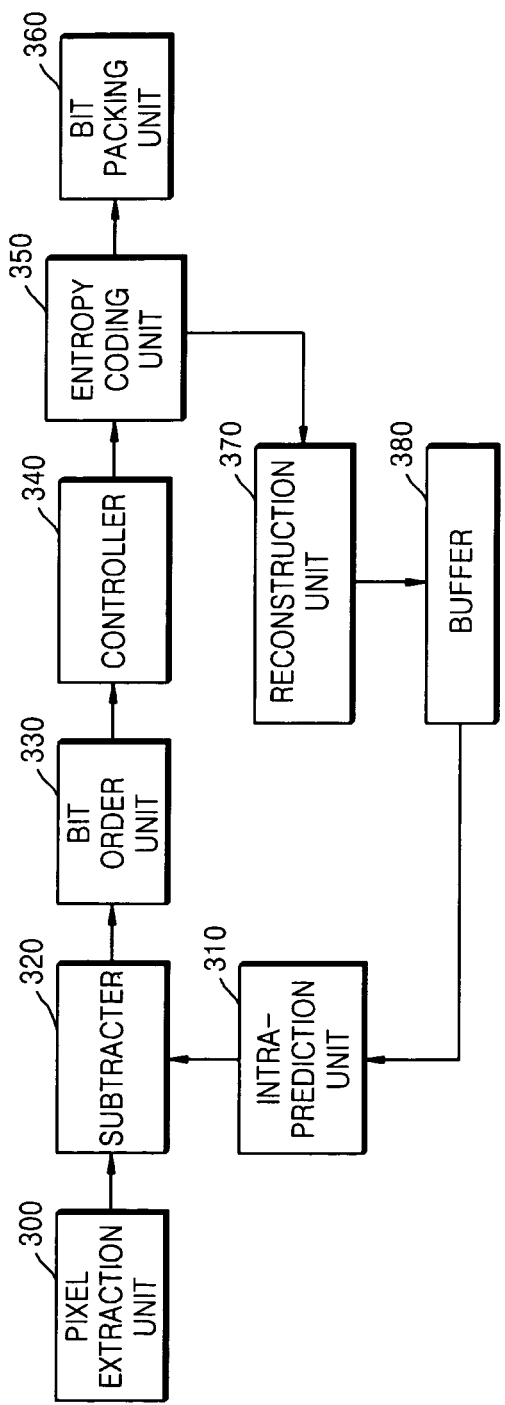
FIG. 3 is a block diagram of a data compression apparatus according to an embodiment of the present invention.

FIG. 3 is a block diagram of the data compression device illustrated in FIG. 2 according to an embodiment of the present invention. Referring to FIG. 3, the data compression device includes a pixel extraction unit 300, an intra-prediction unit 310, a subtractor 320, a bit order unit 330, a controller 340, an entropy coding unit 350, a bit packing unit 360, a reconstruction unit 370, and a buffer 380.

Figure 4:
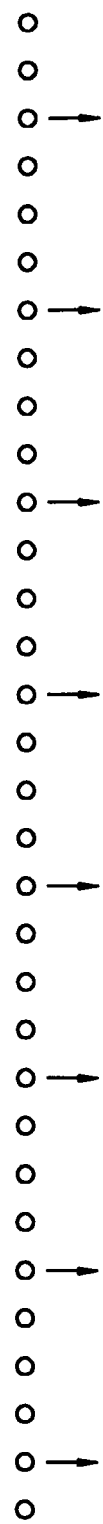
FIG. 4 illustrates an operation of extracting pixels in a pixel extraction unit illustrated in FIG. 3 according to an embodiment of the present invention.

The pixel extraction unit 300 extracts a plurality of pixels from pixels belonging to one of a plurality of lines constructing an image. For example, the pixel extraction unit 300 divides the pixels belonging to one of the plurality of lines constructing the image into N groups and extracts a single pixel from each of the N groups. The pixels extracted by the pixel extraction unit 300 form a single group corresponding to a compression unit of the data compression device according to the current embodiment of the present invention. The pixel extraction unit 300 can sequentially extract eight pixels from the pixels belonging to one of the plurality of lines constructing the image at a predetermined interval to form a single group, as illustrated in FIG. 4. In FIG. 4, t indicates extracted pixels.

The intra-prediction unit 310 performs intra-prediction on each of the extracted pixels forming a single group.

FIG. 5 illustrates prediction directions used in the intra-prediction unit 310 illustrated in FIG. 3 according to an embodiment of the present invention. Referring to FIG. 5, the intra-prediction unit 310 illustrated in FIG. 3 can perform intra-prediction on each of the extracted pixels using a reconstructed pixel located at the top of each extracted pixel, a reconstructed pixel located on the left of each extracted pixel, and a reconstructed pixel located at the top and to the left of the each extracted pixel. For example, the intra-prediction unit 310 can perform intra-prediction using an edge detecting method. An edge represents the contour, position and size of an object in an input picture and corresponds to a line on which the brightness and color of the picture are abruptly changed. It is preferable to use the method disclosed in IEEE Trans. On Consumer Electronics, Vol. 47, No. 3, 2001, pp 466-476, entitled "Two low cost algorithms for improved diagonal edge detection in JPEG-LS", as the edge detecting method.

FIG. 6 illustrates pixels used for intra-prediction according to the edge detecting method. Referring to FIG. 6, an edge detecting algorithm for a pixel x is as follows.

If (c≥max(a,b)) P=min(a,b);
else{If (c≤max(a,b)) P=min(a,b);
   else P=a+b−c;}

Here, a and b represent pixel values, max(a,b) represents a larger value of between a and b, min(a,b) represents a smaller value between a and b, and P denotes a reference pixel value.

According to this algorithm, the reference pixel value P is determined according to whether an edge is in a horizontal direction or a vertical direction and the larger value between a and b. If min(a,b)=a when c≥max(a,b), the edge is in the horizontal direction and the reference pixel value P is determined as a. If min(a,b)=b when c≥max(a,b), the edge is in the vertical direction and the reference pixel value P is determined as b. If max(a,b)=a when c≤max(a,b), the edge is in the horizontal direction and the reference pixel value P is determined as a. If max(a,b)=b when c≤max(a,b), the edge is in the vertical direction and the reference pixel value P is determined as b. When min(a,b)<c<max(a,b), it is difficult to determine that the edge is in the vertical or horizontal direction, and thus the reference pixel value P is determined as a+b−c in consideration of all of a, b and c. In this manner, the reference pixel value P can be easily determined.

If the data compression device 210 illustrated in FIG. 2 includes as many intra-prediction units as the number of the pixels constructing a single group, the pixels constructing a single group can be simultaneously intra-predicted, and thus an encoding time can be reduced. For example, when the pixel extraction unit 310 illustrated in FIG. 3 extracts eight pixels, eight intra-prediction units can respectively intra-predict the eight pixels to reduce an encoding time.

Referring back to FIG. 3, the subtractor 320 respectively subtracts values of reference pixels, determined by the intra-prediction unit 310, from the values of the pixels extracted by the pixel extraction unit 300 to calculate a group of prediction errors with respect to a group of pixels.

The bit order unit 330 orders the bit strings of the group of prediction errors calculated by the subtractor 320 into bit planes. More specifically, the bit order unit 330 orders the most significant bit (MSB) of a bit string of each of the prediction errors into a 0-plane corresponding to the uppermost plane and orders a bit following the MSB into a 1-plane corresponding to an upper plane following the 0-plane. This operation is repeated until the least significant bit (LSB) of the bit string is ordered to order all the bit strings of the prediction errors into bit planes.

FIG. 7 illustrates a group of prediction errors ordered into bit planes by the bit order unit 330 illustrated in FIG. 3 according to an embodiment of the present invention. Referring to FIG. 7, if a single group includes eight pixels and prediction errors are respectively 8, 18, 7, 2, 4, 7, 14 and 5, the bit order unit 330 orders bit strings corresponding to the prediction errors into a 0-plane through a 7-plane in such a manner that the 0-plane, the 1-plane and the 2-plane have '00000000', the 3-plane has '01000000', the 4-plane has '10000010', the 5-plane has '00101111', the 6-plane has '01110110', and the 7-plane has '00100101'.

Referring back to FIG. 3, the controller 340 controls parts of the bit planes ordered by the bit order unit 330 to be coded using variable-length coding and controls parts of the remaining bit planes to be coded using fixed-length coding. Furthermore, the controller 340 cuts off parts of bits of the bit planes in order to achieve a desired compression ratio.

The controller 340 controls to be coded using variable-length coding only parts of the bit planes because of the following reason. Most of prediction errors calculated by the subtractor 320 other than prediction errors calculated for pixels forming a boundary in an image have small values. Thus, there is a high possibility that '0' bit appears in upper bit planes and possibility that '0' bit appears and possibility that '1' bit appears in the lowest bit plane become similar to each other, as illustrated in FIG. 7. Accordingly, it is preferable that upper bit planes are coded using variable-length coding and lower bit planes are fixed-length-coded for efficient data compression. For example, upper five bit planes, that is, the 0-plane through the 4-plane, can be coded using variable-length coding and lower three bit planes, that is, the 5-plane, the 6-plane and the 7-plane, can be coded using fixed-length coding. In this case, the number of upper bit planes variable-length-coded can be set when the data compression device 210 illustrated in FIG. 2 is designed.

There is no need to encode upper bit planes having only '0' bit, and thus from a bit plane in which '1' bit initially appears to the 4-plane are coded using variable-length coding. For example, in the case of the bit planes illustrated in FIG. 7, the 0-plane, the 1-plane and the 2-plane have only '0' bit and '1' bit initially appears in the 3-plane, and thus the 3-plane and the 4-plane are coded using variable-length coding.

The controller 340 illustrated in FIG. 3 controls the ordered bit planes to be encoded according to a raster scan order. The raster scan order means that encoding is performed in the horizontal direction from the leftmost bit of the uppermost bit plane and the next bit plane is encoded when all the bits of the uppermost bit planes are encoded.

Since the data compression device 210 illustrated in FIG. 2 is required to achieve a specific compression ratio, the controller 340 illustrated in FIG. 3 does not encode lower bit planes and deletes the lower bit planes in order to achieve the specific compression ratio.

Figure 8:
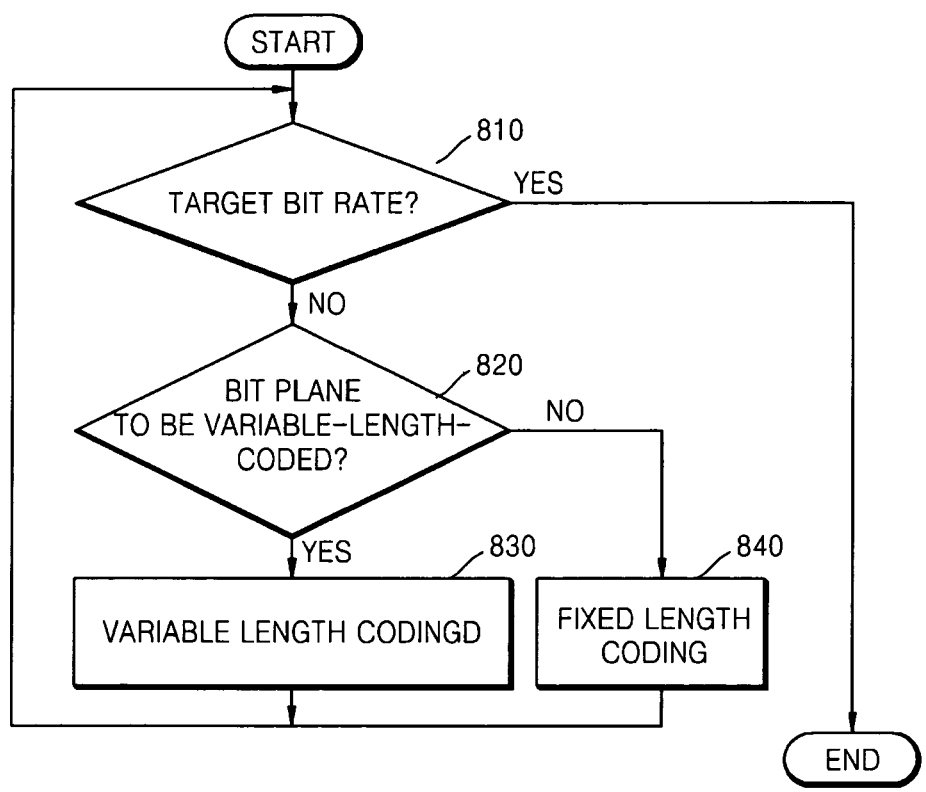
FIG. 8 is a flow chart illustrating an operation of a controller illustrated in FIG. 3 for variable-length-coding parts of bit planes according to an embodiment of the present invention.

FIG. 8 is a flow chart illustrating an operation of the controller 340 illustrated in FIG. 3 for variable-length-coding parts of bit planes according to an embodiment of the present invention. Referring to FIG. 8, the controller 340 illustrated in FIG. 3 determines whether a bit rate of the encoded bit planes reaches a target bit rate according to a desired target compression ratio of the data compression device 210 illustrated in FIG. 2 and finishes encoding when the bit rate of the encoded bit planes correspond to the target bit rate in operation 810. The controller 340 illustrated in FIG. 3 determines whether a bit plane to be encoded requires variable length coding when the bit rate of the encoded bit planes does not reach the target bit rate in operation 820.

The controller 340 illustrated in FIG. 3 provides the bit planes that require variable-length coding to the entropy coding unit 350 illustrated in FIG. 3 when the bit plane to be encoded requires variable length coding such that the entropy coding unit 350 variable-length-codes the bit plane in operation 830.

The controller 340 illustrated in FIG. 3 fixed-length-codes the bit plane to generate a codeword when the bit planes do not require variable-length coding in operation 840. Fixed length coding is to use a current bit plane as a codeword.

Referring back to FIG. 3, the entropy coding unit 350 performs lossless compression encoding including run length coding and Golomb coding on a bit plane that requires variable length coding to generate a codeword.

Specifically, the entropy coding unit 350 executes run length coding. The run length coding encodes binary data into a code which designates the number of repeated '0' bits. In the case of the 4-plane having '10000010' illustrated in FIG. 7, 0 is repeated 0 times, 0 is repeated five times, and then 0 is repeated once, and thus a symbol '051' is generated according to run length coding.

Then, the entropy coding unit 350 performs Golomb coding on the symbol generated by run length coding to generate a codeword. Golomb coding encodes a symbol corresponding to an integer that is not negative into a codeword determined according to several probability distributions and includes Huffman coding using a Golomb code table illustrated in FIG. 9. The Golomb code table used for Golomb coding does not require to be separately stored because a binary codeword with respect to an input symbol can be calculated according to a simple rule. A parameter m used in the Golomb code table is selected such that the length of a codeword generated for each symbol is minimized. When Golomb coding is performed on all symbols using the parameter m equal to 2, the length of a codeword generated according to Golomb coding increases when a symbol corresponding to the codeword is large, as illustrated in FIG. 9. Accordingly, the entropy coding unit 350 illustrated in FIG. 3 selects larger m when probability that symbols have larger values is high to efficiently generate codewords. That is, the entropy coding unit 350 Golomb-codes run-length-coded symbols 0 through 5 using the parameter m equal to 2, Golomb-codes run-length-coded symbols 6 through 11 using the parameter m equal to 4, and Golomb-codes run-length-coded symbols 12 through 23 using the parameter m equal to 8, as illustrated in FIG. 9. For example, when the 4-plane illustrated in FIG. 7 is encoded using the Golomb code table illustrated in FIG. 9, the entropy coding unit 350 generates a codeword '000 1001 001' using the parameter m equal to 4 because the 4-plane has a symbol '051'.

Referring back to FIG. 3, the reconstruction unit 370 reconstructs current pixels using reference pixels determined by the intra-prediction unit 310. The operation of the reconstruction unit 370 is identical to the operation of the data decompression device 230 illustrated in FIG. 2 so that detailed explanation thereof is omitted because the operation of the data decompression device 230 will be described below.

The buffer 380 stores pixels reconstructed by the reconstruction unit 370. When the buffer 380 receives the current pixels, previous pixels have been stored in the buffer 380.

The bit packing unit 360 generates a data packet composed of a plane identifier, a codeword variable-length-coded or fixed-length-coded and provides the data packet to the memory 220 illustrated in FIG. 2. FIG. 10 illustrates a data packet generated by the bit packing unit 360 according to an embodiment of the present invention. In FIG. 10, the plane identifier represents a bit plane in which '1' bit initially appears a bit plane, that is, initially encoded by the entropy coding unit 350 illustrated in FIG. 3. Three bits are allocated to the plane identifier because the plane identifier has one of 0 through 7. For example, the bit packing unit 360 packs a 3-bit plane identifier and a 37-bit codeword to generate a 40-bit data packet when a compression ratio is 1/6 and packs the 3-bit plane identifier and a 57-bit codeword to generate a 60-bit data packet when the compression ratio is 4/1, as illustrated in FIG. 10.

Figure 11:
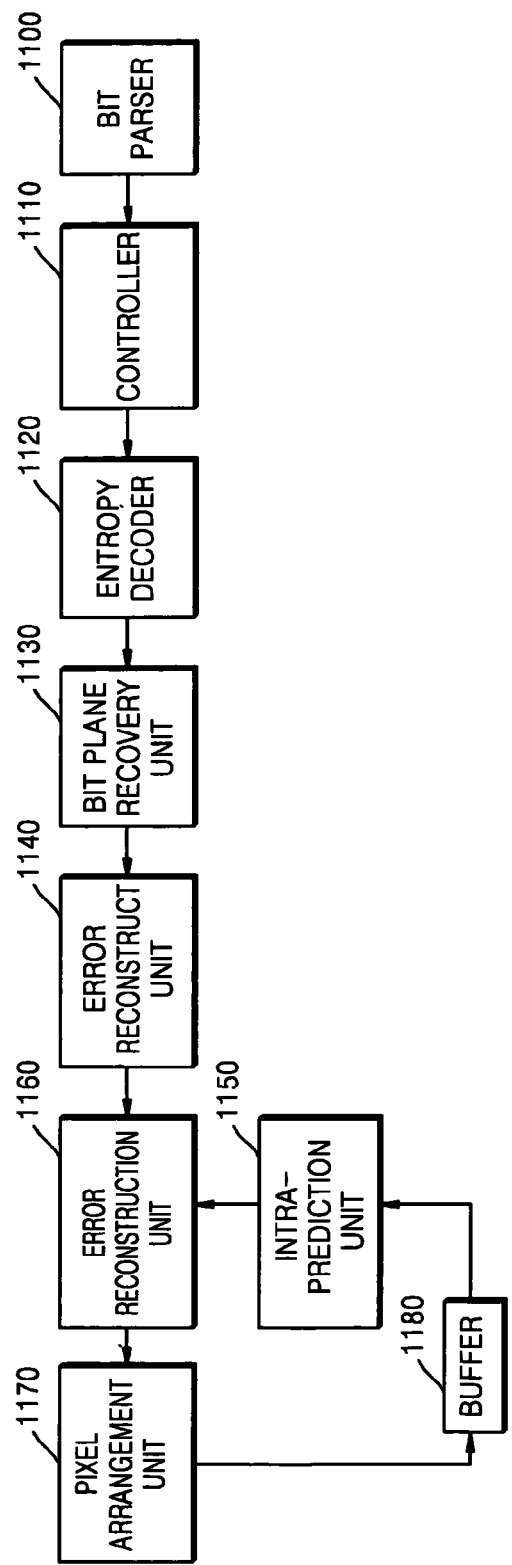
FIG. 11 is a block diagram of a data reconstruction device illustrated in FIG. 2.

FIG. 11 is a block diagram of the data decompression device 230 illustrated in FIG. 2. Referring to FIG. 11, the data decompression device includes a bit parser 1100, a controller 1110, an entropy decoder 1120, a bit plane recovery unit 1130, an error reconstruction unit 1140, an intra-prediction unit 1150, an adder 1160, a pixel arrangement unit 1170, and a buffer 1180.

The bit parser 1100 reads a data packet stored in the memory 220 illustrated in FIG. 2 and parses the data packet to extract a 3-bit plane identifier and a codeword corresponding to coded data. The plane identifier represents a bit plane in which '1' bit appears first and indicates a bit plane initially coded by the entropy coding unit 350 of the data compression device 210 illustrated in FIG. 2.

The controller 1110 determines whether the codeword extracted by the bit parser 1100 requires entropy decoding and controls the codeword to be decoded by the entropy decoder 1120 when the codeword requires entropy decoding. Here, the controller 1110 determines whether the extracted codeword requires entropy decoding by confirming whether the codeword corresponds to a bit plane to be entropy-decoded. The bit plane to be entropy-decoded is previously set when the data decompression device 230 is designed and corresponds to a bit plane entropy-coded in the data compression device 210 illustrated in FIG. 2.

The entropy decoder 1120 entropy-decodes the codeword. The entropy decoder 1120 performs inverse operations of Golomb coding and run length coding to entropy-decode the codeword.

The bit plane recovery unit 1130 orders codewords extracted by the bit parser 1100 into bit planes. Specifically, the bit plane recovery unit 1130 records '0' bit in the uppermost bit plane to an upper bit plane indicated by the plane identifier. Subsequently, the bit plane recovery unit 1130 orders codewords decoded by the entropy decoder 1120 into bit planes, and then orders codewords which do not require decoding from among the extracted codewords into bit planes without changing the codewords. Finally, the bit recovery unit 1130 records '0' bit in the remaining bit planes to accomplish bit plane recovery.

The error reconstruction unit 1140 reads the bit planes recovered by the bit plane recovery unit 1130 in the vertical direction from the uppermost bit plane to reconstruct a group of prediction errors.

The intra-prediction unit 1150 performs intra-prediction on current pixels using reconstructed pixels stored in the buffer 1180. Here, reference pixel values are determined using the same edge detecting method as the edge detecting method used in the intra-prediction unit 310 illustrated in FIG. 3.

The adder 1160 add the prediction errors reconstructed by the error reconstruction unit 1140 and the reference pixel values determined by the intra-prediction unit 1150 to reconstruct the current pixels. The pixel arrangement unit 1170 arranges the reconstructed current pixels at the original positions on a line. The buffer 1180 stores the reconstructed current pixels. When the buffer 1180 receives the current pixels, previous pixels have been stored in the buffer 1180.

Figure 12:
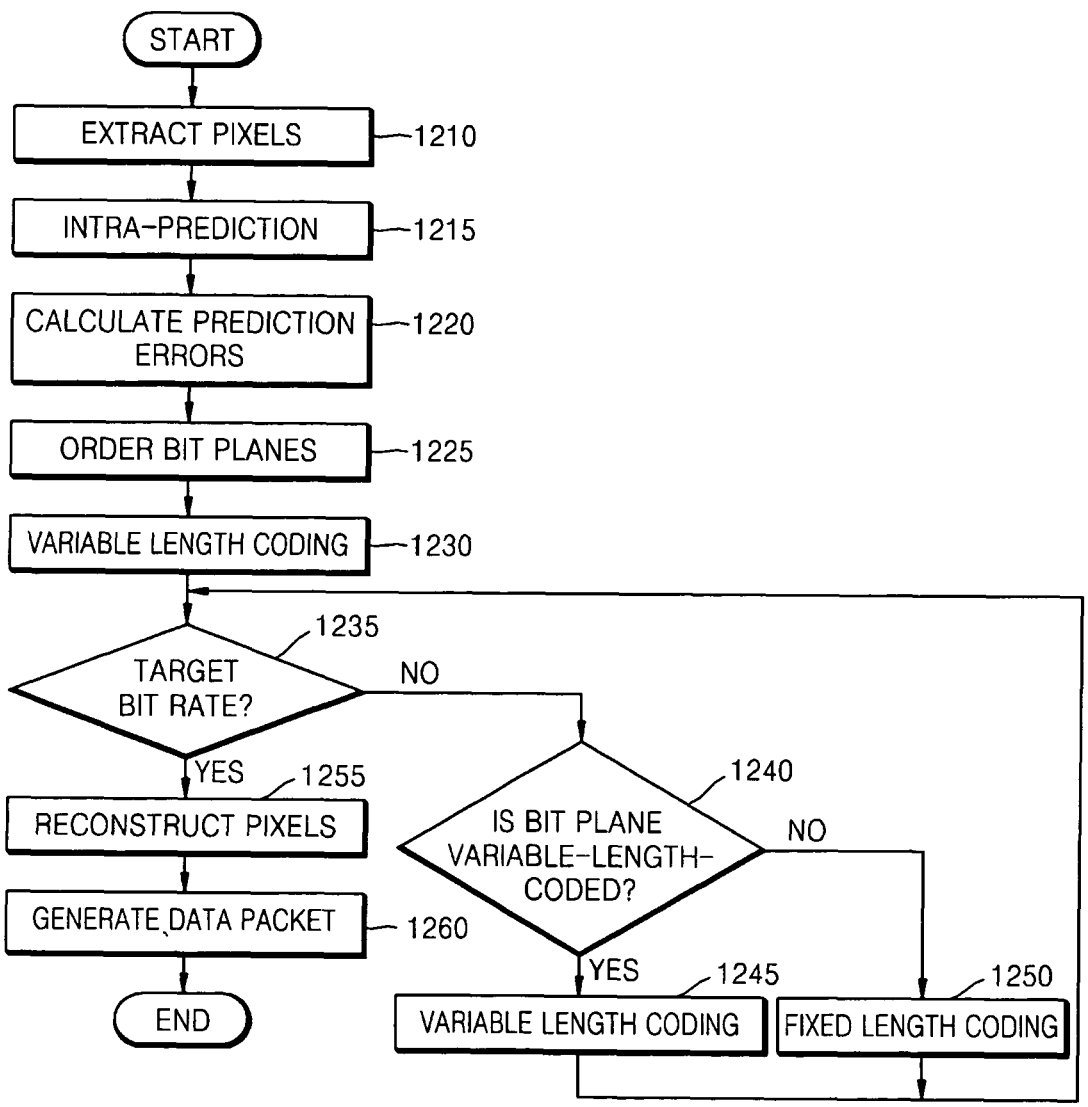
FIG. 12 is a flow chart illustrating a data compression method according to an embodiment of the present invention.

FIG. 12 is a flow chart illustrating a data compression method according to an embodiment of the present invention. Referring to FIG. 12, the data compression method according to an embodiment of the present invention includes operations time-serially performed in the data compression device illustrated in FIG. 3 so that the above-described details with respect to the data compression device illustrated in FIG. 3 are applied to the data compression method.

The data compression device 210 illustrated in FIG. 2 extracts a plurality of pixels from pixels belonging to one of a plurality of lines constructing an image in operation 1210. For example, the plurality of pixels are extracted in such a manner that the pixels belonging to one of the plurality of lines are divided into N groups and a single pixel is extracted from each of the N groups. Otherwise, pixels are extracted from the pixels belonging to one of the lines constructing an image at a predetermined interval. The extracted pixels form a single group corresponding to a compression unit of the data compression device 210 illustrated in FIG. 2.

The data compression device 210 illustrated in FIG. 2 performs intra-prediction on the extracted group of pixels in operation 1215. Here, values of reference pixels for the group of pixels can be determined using an edge detecting method.

The data compression device 210 illustrated in FIG. 2 respectively subtracts the values of the reference pixels determined in operation 1215 from values of the pixels extracted in operation 1210 to calculate prediction errors for the group of pixels in operation 1220.

The data compression device 210 illustrated in FIG. 2 orders bit strings corresponding to the prediction errors calculated in operation 1220 into bit planes. Specifically, the bit order unit 330 illustrated in FIG. 3 orders the most significant bits (MSBs) of the bit strings of the prediction errors into a 0-plane corresponding to the uppermost plane and orders bits following the MSBs into a 1-plane corresponding to an upper plane following the 0-plane. This operation is repeated until the least significant bits (LSBs) of the bit strings are ordered to order all the bit strings of the prediction errors into bit planes in operation 1225.

The data compression device 210 illustrated in FIG. 2 variable-length-codes the bit planes ordered in operation 1225 according to raster scan order in operation 1230. Here, there is no need to encode upper bit planes having only bit '0', and thus variable length coding is performed from the bit plane which initially includes '1' bit. Furthermore, a plane identifier for identifying an initially coded bit plane is generated.

The data compression device 210 illustrated in FIG. 2 determines whether a bit rate of the encoded bit planes corresponds to a target bit rate according to a desired target compression ratio in operation 1235. When the bit rate of the encoded bit planes corresponds to the target bit rate, the data compression device 210 illustrated in FIG. 2 finishes coding because the target compression ratio is achieved and goes to operation 1255.

When the bit rate of the encoded bit planes does not reach the target bit rate, the data compression device 210 illustrated in FIG. 2 determines whether a current bit plane to be coded requires variable length coding in operation 1240. Here, bit planes to be variable-length-coded are previously set in the data compression device 210 illustrated in FIG. 210.

The data compression device 210 illustrated in FIG. 2 entropy-codes the current bit plane to generate a codeword when the current bit plane requires variable length coding in operation 1245, and then goes to operation 1235. That is, the data compression device 210 illustrated in FIG. 2 performs entropy coding corresponding lossless compression coding including run length coding and Golomb coding on the bit plane that requires variable length coding to generate a codeword.

The data compression device 210 illustrated in FIG. 2 fixed-length-codes the current bit plane to generate a codeword in operation 1250 when the current bit plane does not require variable length coding, and then goes to operation 1235. Fixed length coding is to use the current bit plane as a codeword.

In operation 1255, the data compression device 210 illustrated in FIG. 2 reconstructs the pixels extracted in operation 1210 using the plane identifier generated in operation 1230, the codeword generated in operation 1245, the codeword generated in operation 1250 and the reference pixel values determined in operation 1220. A process of reconstructing the extracted pixels is identical to a data decompression method illustrated in FIG. 13 so that detailed explanation there of is omitted.

The data compression device 210 illustrated in FIG. 2 generates a data packet composed of the plane identifier generated in operation 1230, the codeword generated in operation 1245 and the codeword generated in operation 1250 and provides the data packet to the memory 220 illustrated in FIG. 2 in operation 1260.

FIG. 13 is a flow chart of a data decompression method according to an embodiment of the present invention. Referring to FIG. 13, the data decompression method includes operations time-serially performed in the data decompression device 230 illustrated in FIG. 2.

The data decompression device 230 illustrated in FIG. 2 reads a data packet stored in the memory 220 illustrated in FIG. 2 and parses the data packet to extract a 3-bit plane identifier and a codeword corresponding to coded data in operation 1310.

The data decompression device 230 illustrated in FIG. 2 determines whether the codeword extracted in operation 1310 requires entropy decoding by confirming whether the extracted codeword corresponding to a bit plane to be entropy-decoded in operation 1315. The bit plane to be entropy-decoded is previously set when the data decompression device 230 illustrated in FIG. 2 is designed and corresponds to a bit plane entropy-coded in the data compression device 210 illustrated in FIG. 2.

The data decompression device 230 illustrated in FIG. 2 orders the extracted codeword into a bit plane when the extracted codeword does not require entropy decoding in operation 1320.

The data decompression device 230 illustrated in FIG. 2 entropy-decodes the extracted codeword when the extracted codeword requires entropy decoding in operation 1325. For example, the data decompression device 230 illustrated in FIG. 2 performs inverse operations of Golomb coding and run length coding to carry out entropy decoding.

The data decompression device 230 illustrated in FIG. 2 orders the entropy-decoded codeword into a bit plane in operation 1330. The data decompression device 230 illustrated in FIG. 2 determines whether there is another extracted codeword in operation 1335 and performs operation 1315 when there is another extracted codeword in operation 1335.

When there is no further extracted codeword in operation 1335, the data decompression device 230 illustrated in FIG. 2 records '0' bit in remaining bit planes to accomplish bit plane recovery in operation 1340.

The data decompression device 230 illustrated in FIG. 2 vertically reads the recovered bit planes from the MSB to reconstruct a group of prediction errors in operation 1345. The data decompression device 230 illustrated in FIG. 2 performs intra-prediction using a previous group of pixels in operation 1350. Here, values of reference pixels of a current group of pixels are determined using the same edge detecting method as the edge detecting method used for intra-prediction in the data compression device 210 illustrated in FIG. 2.

The data decompression device 230 illustrated in FIG. 2 add the prediction errors restored in operation 1345 and the reference pixel values determined in operation 1350 to reconstruct current pixels in operation 1355. The data decompression device 230 illustrated in FIG. 2 arranges the current pixels reconstructed in the operation 1355 at original positions on a line to reconstruct a compressed image.

The embodiments of the present invention can be written as computer programs and can be implemented in general-use digital computers that execute the programs using a computer readable recording medium. Examples of the computer readable recording medium include magnetic storage media (e.g., ROM, floppy disks, hard disks, etc.), and optical recording media (e.g., CD-ROMs, or DVDs). The computer readable recording medium can also be distributed over network coupled computer systems so that the computer readable code is stored and executed in a distribution fashion.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of compressing data, comprising:
calculating differences between values of current pixels from among pixels constructing an image and values of reference pixels respectively corresponding to the current pixels;
ordering a plurality of bit strings, which represent the differences by a plurality of bits, into bit planes comprising a first bit plane and a second bit plane, wherein the bit plane is a set of bits having a same position in the bit strings;
coding bits belonging to the first bit plane into a first codeword using variable-length coding; and
coding bits belonging to the second bit plane into a second codeword using fixed-length coding.

2. A method of compressing data, comprising:
calculating differences between values of current pixels from among pixels constructing an image and values of reference pixels respectively corresponding to the current pixels;
ordering bit strings, which represent the differences by a plurality of bits, into bit planes, wherein the bit plane is a set of bits having a same position in the bit strings; and
coding the bit planes according to priority of the bit planes;
wherein the upper bit planes are coded using variable-length coding and lower bit planes are coded using fixed-length coding, and
wherein the coding of the bit planes comprises coding the bit planes according to priority of the bit planes until a bit rate of the coded bit planes reaches a predetermined target bit rate.

3. The method of claim 1, wherein the second bit plane corresponds to least significant bit.

4. The method of claim 1, wherein the coding of the bit planes comprises run-length-coding and Golomb-coding a bit plane that requires entropy coding from among the ordered bit planes.

5. The method of claim 1, wherein the second codeword corresponds to bit string of bits belonging to the second bit plane.

6. The method of claim 1, wherein the current pixels are respectively extracted from groups obtained by dividing pixels belonging to one of lines constructing the image.

7. The method of claim 1, wherein the current pixels are extracted from pixels belonging to one of lines constructing the image at a predetermined interval.

8. The method of claim 1, wherein the reference pixels correspond to the current pixels in directions of edges detected for the current pixels.

9. A non-transitory computer readable recording medium storing computer-readable instructions that control at least one processor to implement a method of compressing data, the method comprising:
calculating differences between values of current pixels from among pixels constructing an image and values of reference pixels respectively corresponding to the current pixels;
ordering a plurality of bit strings, which represent the differences by a plurality of bits, into bit planes comprising a first bit plane and a second bit plane, wherein the bit plane is a set of bits having a same position in the bit strings;
coding bits belonging to the first bit plane into a first codeword using variable-length coding; and
coding bits belonging to the second bit plane into a second codeword using fixed-length coding.

10. An apparatus of compressing data, comprising:
a subtractor calculating differences between values of current pixels from among pixels constructing an image and values of reference pixels respectively corresponding to the current pixels;
a bit order unit ordering a plurality of bit strings, which represent the differences by a plurality of bits, into bit planes comprising a first bit plane and a second bit plane, wherein the bit plane is a set of bits having a same position in the bit strings; and
a coding unit coding bits belonging to the first bit plane into a first codeword using variable-length coding and coding bits belonging to the second bit plane into a second codeword using fixed-length coding.

11. An apparatus of compressing data, comprising:
a subtractor calculating differences between values of current pixels from among pixels constructing an image and values of reference pixels respectively corresponding to the current pixels;
a bit order unit ordering bit strings, which represent the differences by a plurality of bits, into bit planes, wherein the bit plane is a set of bits having a same position in the bit strings; and
a coding unit coding the bit planes according to priority of the bit planes;
wherein the upper bit planes are coded using variable-length coding and lower bit planes are coded using fixed-length coding, and
wherein the coding unit codes the bit planes according to priority of the bit planes until a bit rate of the coded bit planes reaches a predetermined target bit rate.

12. The apparatus of claim 10, wherein the second bit plane corresponds to least significant bit.

13. The apparatus of claim 10, wherein the coding unit run-length-codes and Golomb-codes a bit plane requiring entropy coding from among the ordered bit planes.

14. A method of decompressing data, comprising:
decoding coded data;
ordering the decoded data into bit planes, wherein the bit plane is a set of bits having a same position in bit strings;
reading the ordered bit planes in a vertical direction, which correspond to a priority order of the bit strings and a predetermined target bit rate to reconstruct prediction errors; and
adding the reconstructed prediction errors and reference pixel values respectively corresponding to the prediction errors to reconstruct current pixels;
wherein the upper bit planes are coded using variable-length coding and lower bit planes are coded using fixed-length coding.

15. A non-transitory computer readable recording medium storing computer-readable instructions that control at least one processor to implement a method of decompressing data, the method comprising:

decoding coded data;
ordering the decoded data into bit planes, wherein the bit plane is a set of bits having a same position in bit strings;
reading the ordered bit planes in a vertical direction, which correspond to a priority order of the bit strings and a predetermined target bit rate to reconstruct prediction errors; and
adding the reconstructed prediction errors and reference pixel values respectively corresponding to the prediction errors to reconstruct current pixels;
wherein the upper bit planes are coded using variable-length coding and lower bit planes are coded using fixed-length coding.

16. An apparatus of decompressing data, comprising:
a decoder decoding coded data;
a bit plane recovery unit ordering the decoded data into bit planes, wherein the bit plane is a set of bits having a same position in bit strings;
an error reconstruction unit reading the ordered bit planes in a vertical direction, which correspond to a priority order of the bit strings and a predetermined target bit rate to reconstruct prediction errors; and
an adder adding the reconstructed prediction errors and reference pixel values respectively corresponding to the prediction errors to reconstruct current pixels;
wherein the upper bit planes are coded using variable-length coding and lower bit planes are coded using fixed-length coding.

17. The method of claim 1, wherein the variable-length coding begins with the first upper bit plane to have a non-zero value.

18. The method of claim 14, wherein the variable-length coding begins with the first upper bit plane to have a non-zero value.

* * * * *